United States Patent [19]
Burdsall et al.

[11] Patent Number: 5,163,274
[45] Date of Patent: Nov. 17, 1992

[54] DECK MOUNTING SYSTEM FOR RIDING LAWN MOWER

[75] Inventors: Thomas A. Burdsall; Joseph P. Dechamps, both of Jackson, Tenn.

[73] Assignee: Noma Outdoor Products, Inc., Jackson, Tenn.

[21] Appl. No.: 760,593

[22] Filed: Sep. 16, 1991

[51] Int. Cl.⁵ .............................................. A01D 34/00
[52] U.S. Cl. ...................................... 56/14.9; 56/208; 56/DIG. 22
[58] Field of Search ................. 56/14.7–15.5, 56/16.7, 17.1, 17.2, 208, 212, DIG. 22, 320.1, 320.2

[56] References Cited

U.S. PATENT DOCUMENTS

| | | | |
|---|---|---|---|
| 2,862,343 | 12/1958 | Wood | 56/25.4 |
| 2,949,004 | 8/1960 | Jones | 56/25.4 |
| 3,229,452 | 1/1966 | Hasenbank | 56/25.4 |
| 3,601,958 | 8/1971 | Roof | 56/14.9 X |
| 3,706,186 | 12/1972 | Hurlburt et al. | 56/DIG. 22 X |
| 4,187,924 | 2/1980 | Deschamps | 56/DIG. 22 |
| 4,313,295 | 2/1982 | Hansen et al. | 56/15.8 |
| 4,621,699 | 11/1986 | Slazas | 56/DIG. 22 |
| 4,882,898 | 11/1989 | Samejima et al. | 56/208 |
| 4,916,889 | 4/1990 | Molstad | 56/14.9 |
| 5,065,568 | 11/1991 | Braun et al. | 56/14.9 |

Primary Examiner—Thuy M. Bui
Attorney, Agent, or Firm—Heiskell, Donelson, Bearman, Adams, Williams & Kirsch

[57] ABSTRACT

A cutting deck mounting system for use on a riding lawn mower is disclosed, having a front linkage attached to a front portion of the cutting deck and to the frame of the mower, a plurality of mounting brackets disposed on the rear axle housing, a rear linkage having a first portion secured to the cutting deck and a second portion slidably disposed in the mounting brackets, and height adjustment members for selectively raising and lowering the cutting deck. The front and rear linkages are operative to maintain the cutting deck in a substantially constant horizontal orientation relative to the ground regardless of the cutting height. The rear linkages also operates to maintain the cutting deck laterally parallel to the axles during operation of the mower. The disclosed mounting system allows torsional flexing of the frame along its longitudinal axis without significantly affecting the orientation of the cutting deck relative to the ground.

13 Claims, 6 Drawing Sheets

Fig.1
(PROIR ART)

DECK MOUNTING SYSTEM FOR RIDING LAWN MOWER

BACKGROUND OF THE INVENTION

1. Field

This invention relates to riding lawn mowers and, more particularly, to the system for mounting the cutting deck on a rear engine riding mower.

2. Description of the Prior Art

Riding lawn mowers have been available for many years and in a wide variety of configurations, being categorized generally as either rear engine or front engine mowers depending upon the placement of the engine in relation to the driver. Typically, riding mowers have a cutting deck suspended generally between the front and rear wheels, serving as a housing for the blade(s). It is common practice for such mowers to also include a height adjustment mechanism for selectively adjusting the cutting height (i.e., the height of the cutting deck from the ground), and for the cutting deck to be suspended in a manner allowing for such height adjustment while maintaining the cutting deck generally parallel to the ground.

Conventional cutting deck mounting systems include a pair of hinged links securing the cutting deck to the frame of the mower. If the frame is sufficiently rigid the cutting deck will maintain its generally parallel orientation with respect to the ground, even when the mower is operated across an inclined or uneven surface. In order to maintain the parallel orientation of the cutting deck under such circumstances, the frame must be stiff enough to avoid twisting along its longitudinal axis commonly caused when one wheel encounters an elevated surface. If the frame is not stiff enough to resist such twisting, the cutting deck will not tilt sufficiently to accommodate the elevated surface, thereby resulting in a condition known as "scalping" where the grass is unintentionally cut too short in an isolated location. This has been a particular problem with rear engine mowers, since their frames are generally lighter and less resistant to torsional flexing than the frames used for front engine mowers.

Since it is highly desirable to avoid scalping portions of the lawn, frames for rear engine riding mowers must be strengthened in order to withstand the torsional forces which cause twisting. Such a high degree of stiffness, or torsional rigidity, requires the frames to be much heavier and expensive than would be required under ideal circumstances. Accordingly, a need has been recognized for a cutting deck mounting system which enables the cutting deck to tilt when required to avoid scalping the lawn, without necessitating the use of an unusually rigid frame.

BRIEF SUMMARY OF THE INVENTION

According to the present invention, a cutting deck mounting system is provided for use on a riding lawn mower, the mounting system being operative to maintain the cutting deck in a position generally latitudinally parallel to the rear axle of the mower. The mounting system includes a front link for suspending the front portion of the cutting deck from a portion of the mower frame located generally between the front wheels. The mounting system also includes a rear link pivotally secured to an upper surface of the cutting deck and stabilizing the rear portion of the cutting deck from brackets mounted to the rear axle housing. The brackets are adapted to prohibit lateral movement of the rear link, yet allow the rear link to slide longitudinally therein as the cutting deck is raised and lowered by the user. Finally, the mounting system also includes a height adjustment mechanism whereby the user can selectively adjust the cutting height, with the front and rear links being adapted to maintain the cutting deck in a generally level position.

When a riding mower equipped with the present mounting systems encounters uneven terrain which elevates one side of the mower relative to the other, the cutting deck tilts in conjunction with the rear axle in order to avoid scalping. Normal flexing or twisting of the mower frame under such circumstances will not affect the lateral orientation of the cutting deck.

It is a primary object of this invention to provide a cutting deck mounting system which allows the cutting deck to tilt as required in order to avoid scalping the lawn. It is a further object to provide a cutting deck mounting system which maintains the lateral orientation of the cutting deck generally parallel to the rear axle, whereby the cutting deck tilts in conjunction with the axle.

It is also an object of this invention to provide such a cutting deck mounting system which enables the user to selectively adjust the cutting height while maintaining the cutting deck in a position generally parallel to the ground. It is yet another object of this invention to provide a cutting deck mounting system for which the cutting height is substantially unaffected by normal frame twisting during use.

These and other objects of the present invention will become apparent from a reading of the following specification, taken in conjunction with the enclosed drawings.

DETAILED DESCRIPTION OF THE PREFERRED EMBODIMENT

Figure 1:
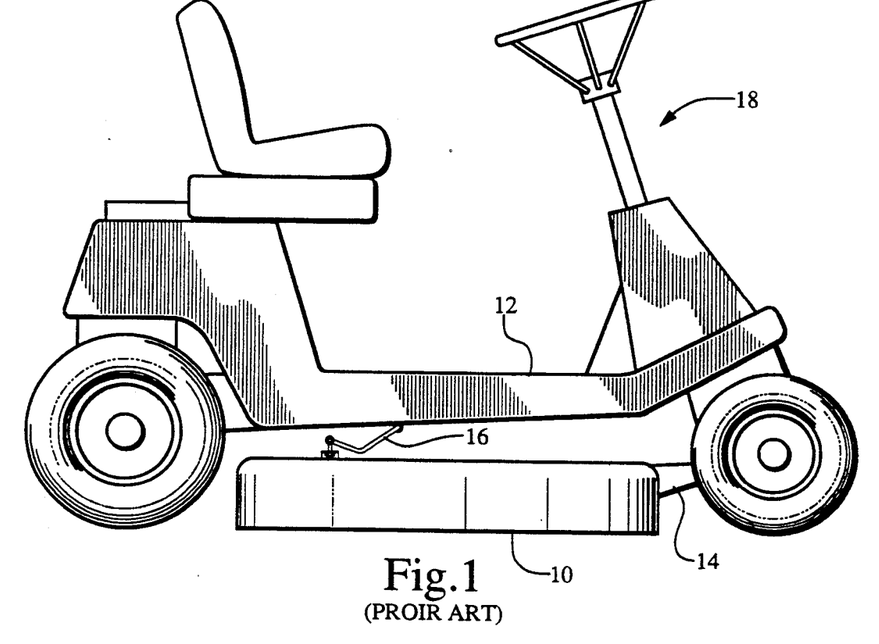
FIG. 1 is a side elevational view of a riding mower having a conventional cutting deck mounting system.
Figure 2:
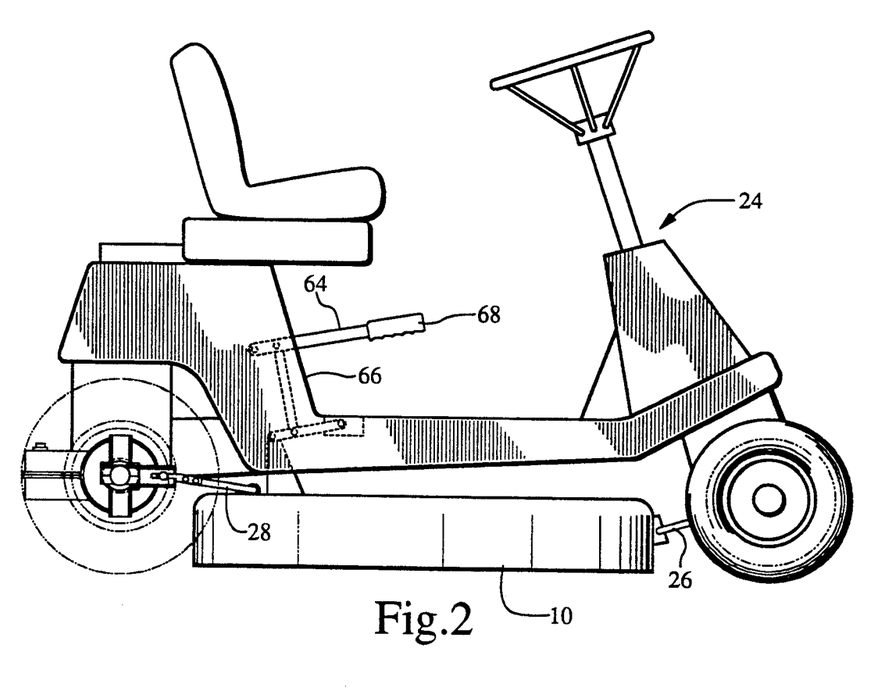
FIG. 2 is a side elevational view of a riding mower having a cutting deck mounting system in accordance with the preferred embodiment of this invention.
Figure 3:
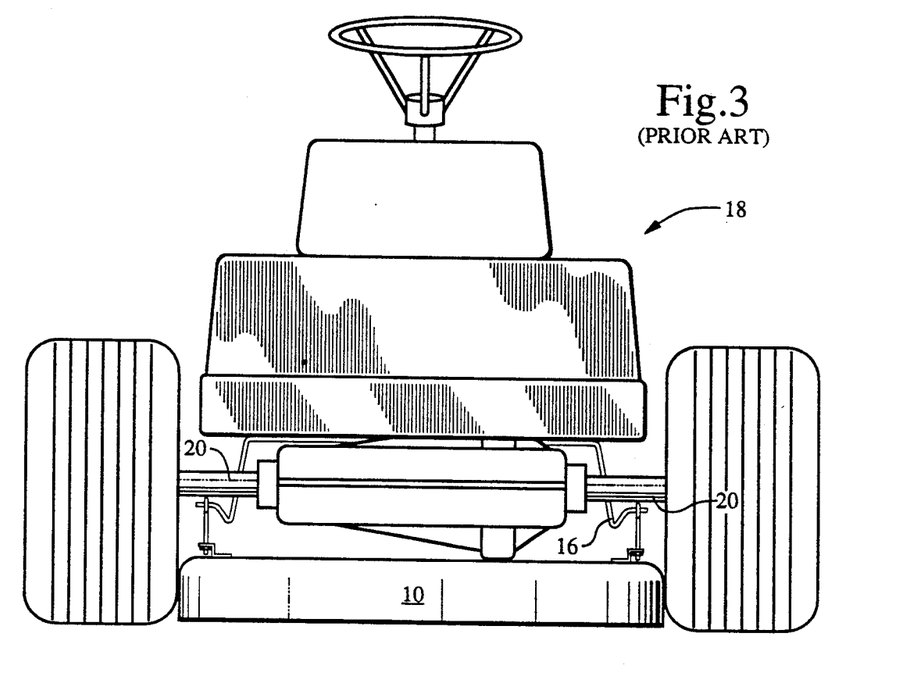
FIG. 3 is a rear elevational view of a riding mower having a conventional cutting deck mounting system.
Figure 4:
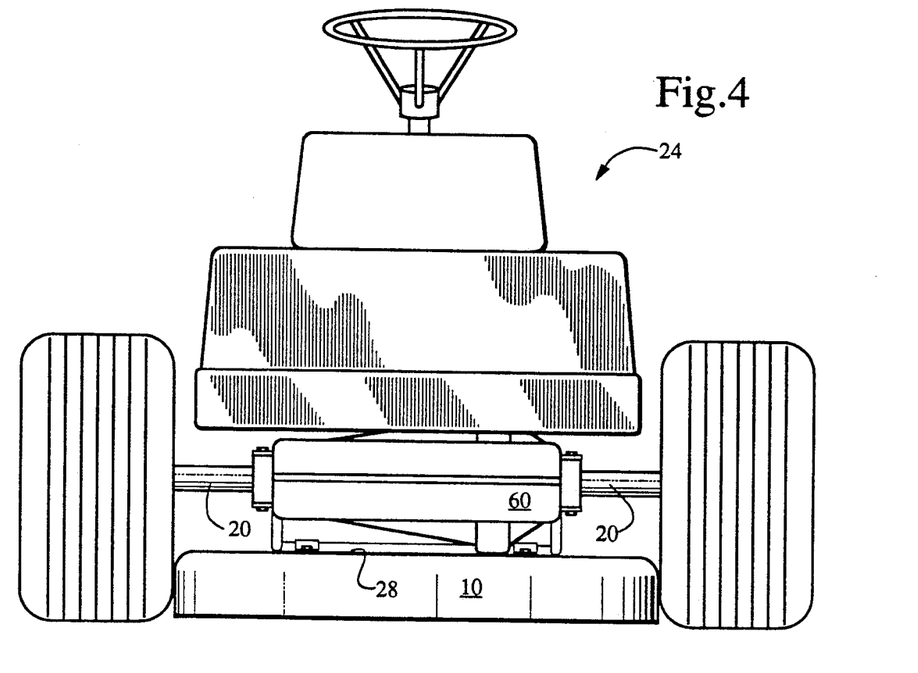
FIG. 4 is a rear elevational view of a riding mower having a cutting deck mounting system in accordance with the preferred embodiment of this invention.
Figure 5:
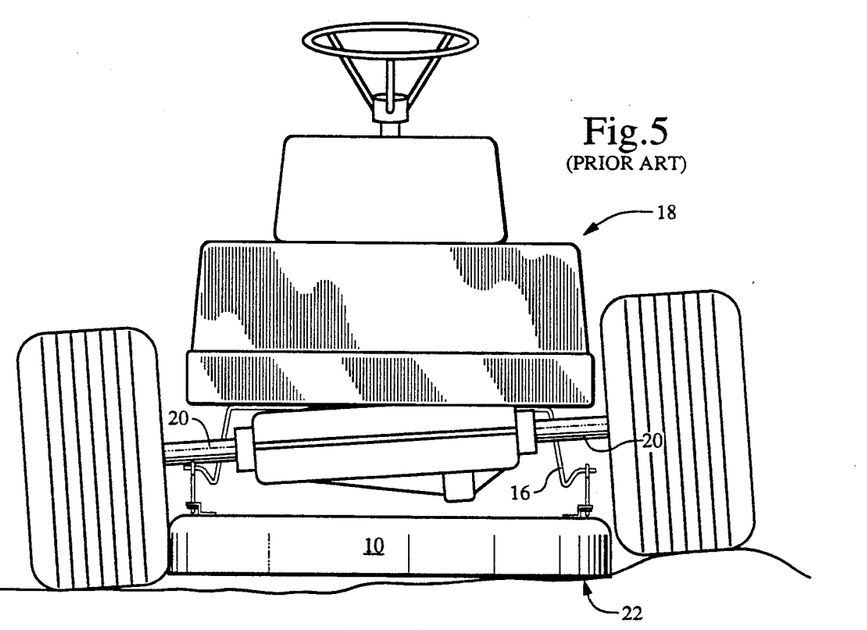
FIG. 5 is a rear elevational view of the conventional mower shown in FIG. 3, showing the lateral orientation of the cutting deck when the mower encounters an uneven surface.
Figure 6:
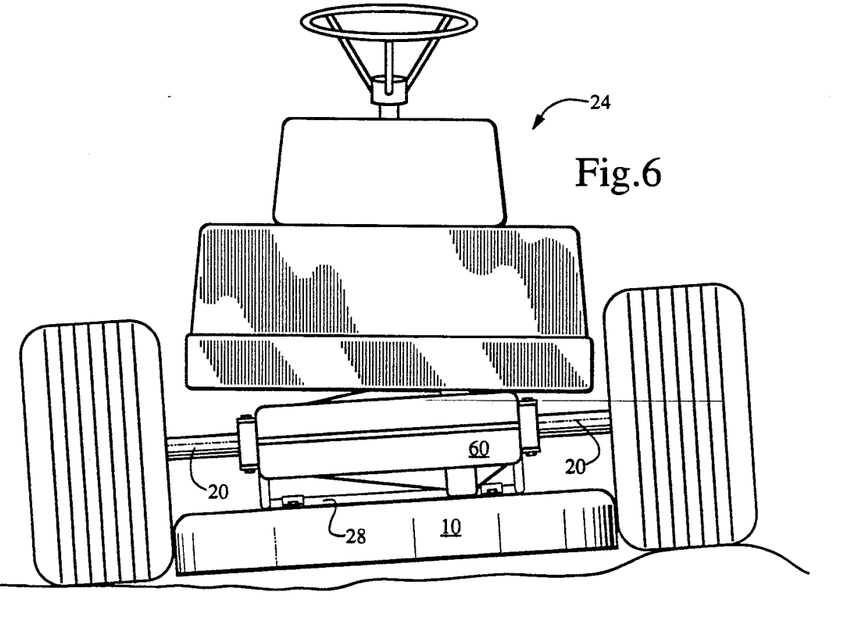
FIG. 6 is a rear elevational view of the mower shown in FIG. 4, showing the lateral orientation of the cutting deck with the preferred embodiment of this invention when the mower encounters an uneven surface.

In order to fully appreciate the features and advantages provided by the preferred embodiment of this invention, it is helpful to keep in mind the conventional cutting deck mounting system, as best illustrated in FIGS. 1, 3, and 5. With the conventional system, cutting deck 10 is suspended from frame 12 by front support link 14 and rear support link 16, with rear support link 16 being pivotally mounted to the underside of frame 12. When conventional mower 18 encounters an uneven mowing surface as shown in FIG. 5, torsional forces cause frame 12 to twist about its longitudinal axis. Rear axle 20, being substantially rigid, maintains its generally parallel orientation relative to the ground, resulting in lateral misalignment between rear axle 20 and frame 12, and corresponding misalignment between rear axle 20 and cutting deck 10. Such tilting of cutting deck 10 results in an uneven cutting height and, in extreme cases, complete scalping of the grass as shown at area 22. In order to avoid scalping in such instances with conventional lawn mowers in this class, the torsional rigidity of frame 12 must be greatly increased, thereby resulting in added weight and expense.

With the unique deck mounting system of the present invention, as incorporated onto mower 24, generally conventional cutting deck 10 is provided with a front support link 26, and rear support link 28. The rear portion 30 of front support link 26 is pivotally secured to bracket 32, which is fixedly secured to the front portion of cutting deck 10. The front portion 34 of link 26 is pivotally secured to mounting bracket 36 which is secured to structural member 38. Structural member 38 is fixed by welding or other suitable means to the front portion 40 of frame 12 and, accordingly, represents an essentially rigid extension of frame 12.

Figure 7:
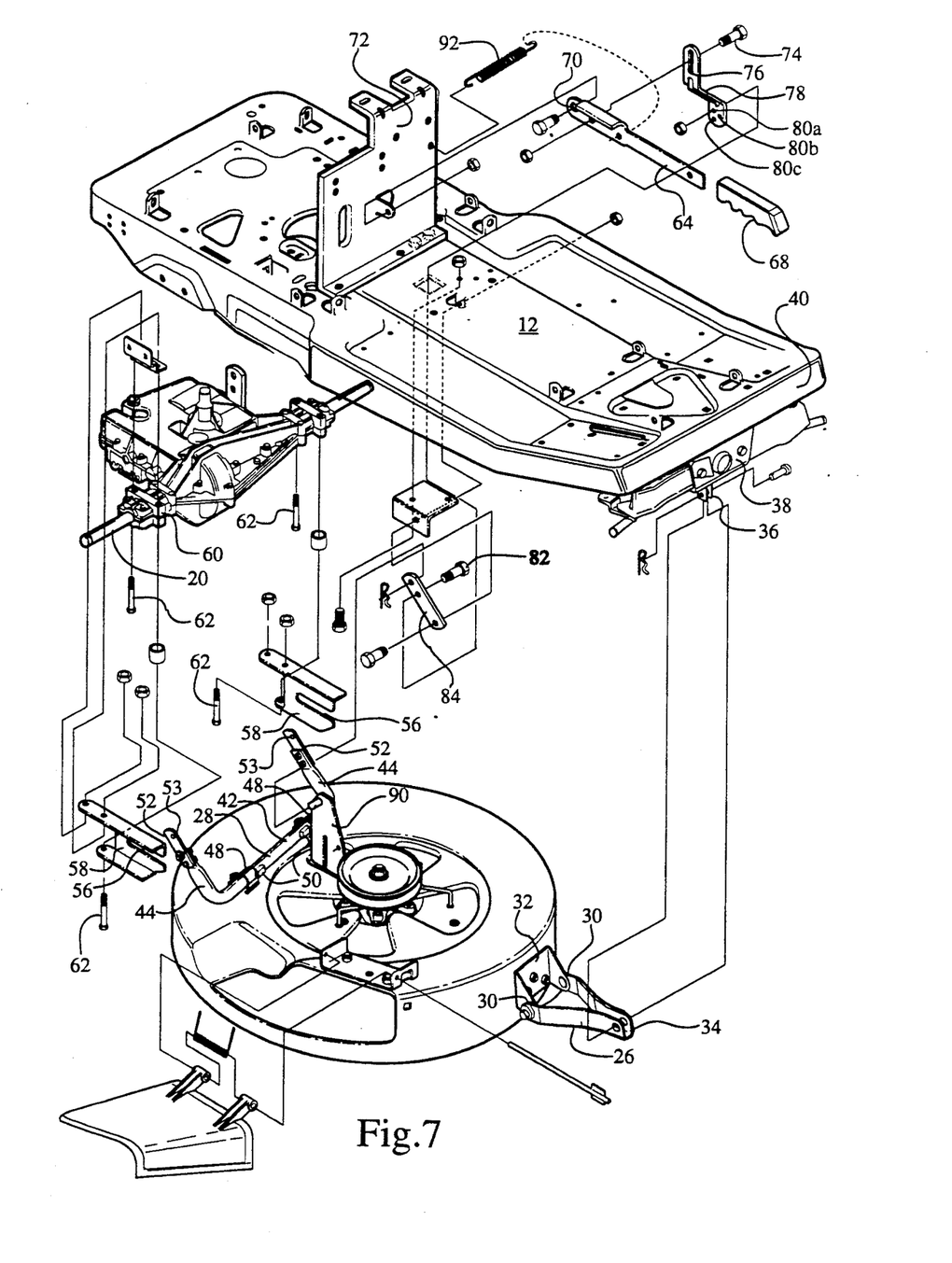
FIG. 7 represents an exploded assembly view of the preferred embodiment of the mounting system of the present invention and related components.

Rear support link 28 comprises a generally straight central portion 42, with ends 44 being formed at generally right angles thereto. Central portion 42 is rotatably secured to the upper surface of deck 10 by means of brackets 48, and includes stops 50 welded thereto to limit lateral translation. The distal ends of end portions 44 are flattened and, in the preferred embodiments shown, include a pair of hole formed therethrough for receiving a pair of screws utilized to secure members 52 thereto.

Members 52 preferably have three holes formed therethrough, two of which are positioned for alignment with the mounting holes in the flattened ends of end portions 44 of rear support link 28. Conventional nuts and bolts may be utilized to secure members 52 to the flattened portion of end portions 44 through said mounting holes, but it is preferable for one of such mounting holes to be enlarged with an eccentric nut disposed therein to provide a degree of linear adjustability between members 52 and end portions 44. In a similar manner, rear portion 30 of front support link 26 preferably has enlarged holes formed therein also for receiving eccentric nuts threadingly engaged with the screws utilized to secure front support link 26 to bracket 32. Those skilled in the art will fully understand that such use of eccentric nuts provides means for adjusting the level of cutting deck 10 along both its latitudinal and longitudinal axes. It is expected that the proper setting for the eccentric nuts will be determined upon the initial attachment of the cutting deck assembly to the frame, with periodic adjustment being necessitated by normal wear and usage of the mower.

The third hole 53 formed in the distal end of each of members 52 receives a shoulder bolt 54 which is slidably disposed in the elongated opening 56 of brackets 58. Brackets 58 are rigidly secured to housing 60 for rear axle 20, preferably by means of bolts 62. When so assembled, raising deck 10 results in the rearward rotation of rear support link 28 and corresponding rearward linear movement of shoulder bolts 54 within elongated openings 56 of brackets 58, while lowering deck 10 results in the forward rotation of rear link 28 and corresponding forward linear movement of shoulder bolts 54 within an elongated openings 56. Regardless of whether deck 10 is in a raised, lowered, or intermediate position, the lateral orientation of deck 10 with respect to axle 20 and housing 60 remains essentially constant; i.e., the latitudinal axis of cutting deck 10 is always maintained in a substantially parallel relationship with rear axle 20.

Figure 8:
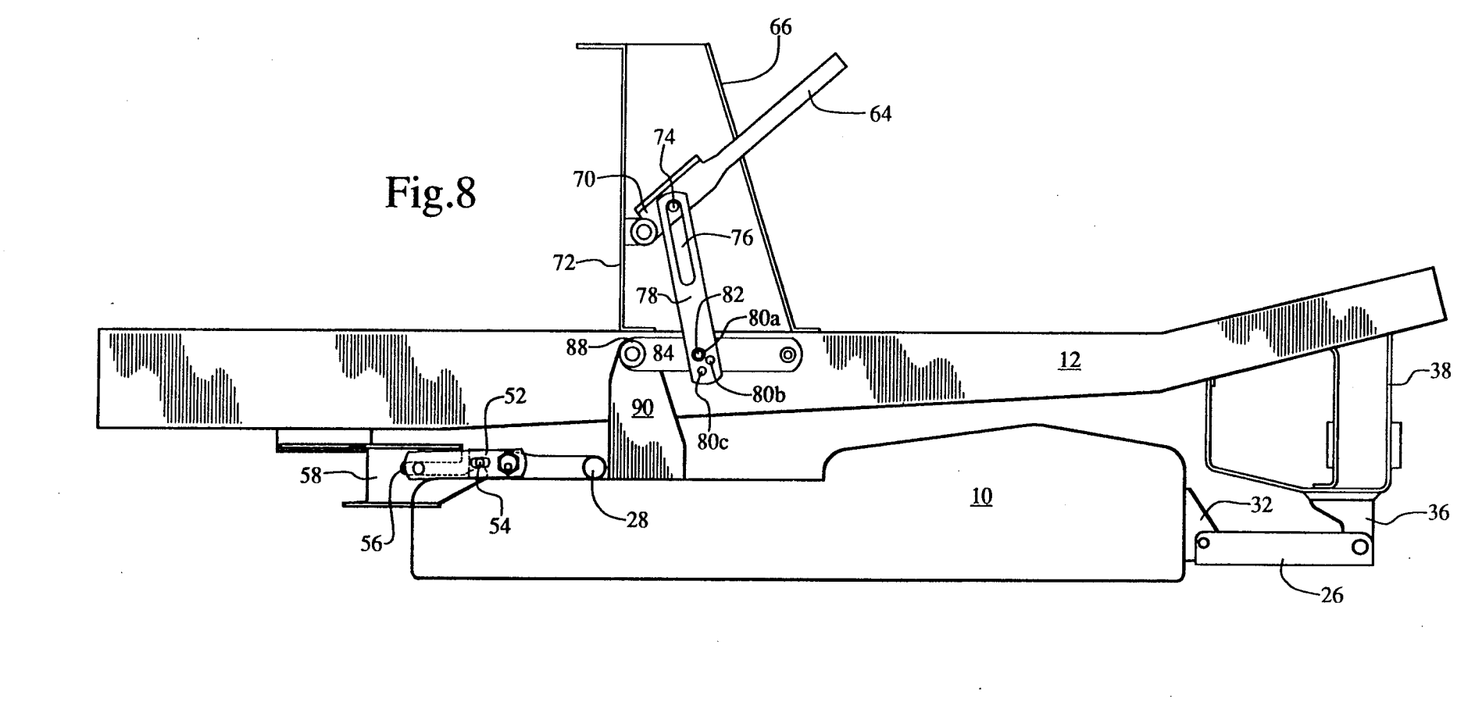
FIG. 8 is an enlarged, right side schematic illustrating the mounting system and height adjustment mechanism of the present invention with the cutting deck in its uppermost raised position.
Figure 9:
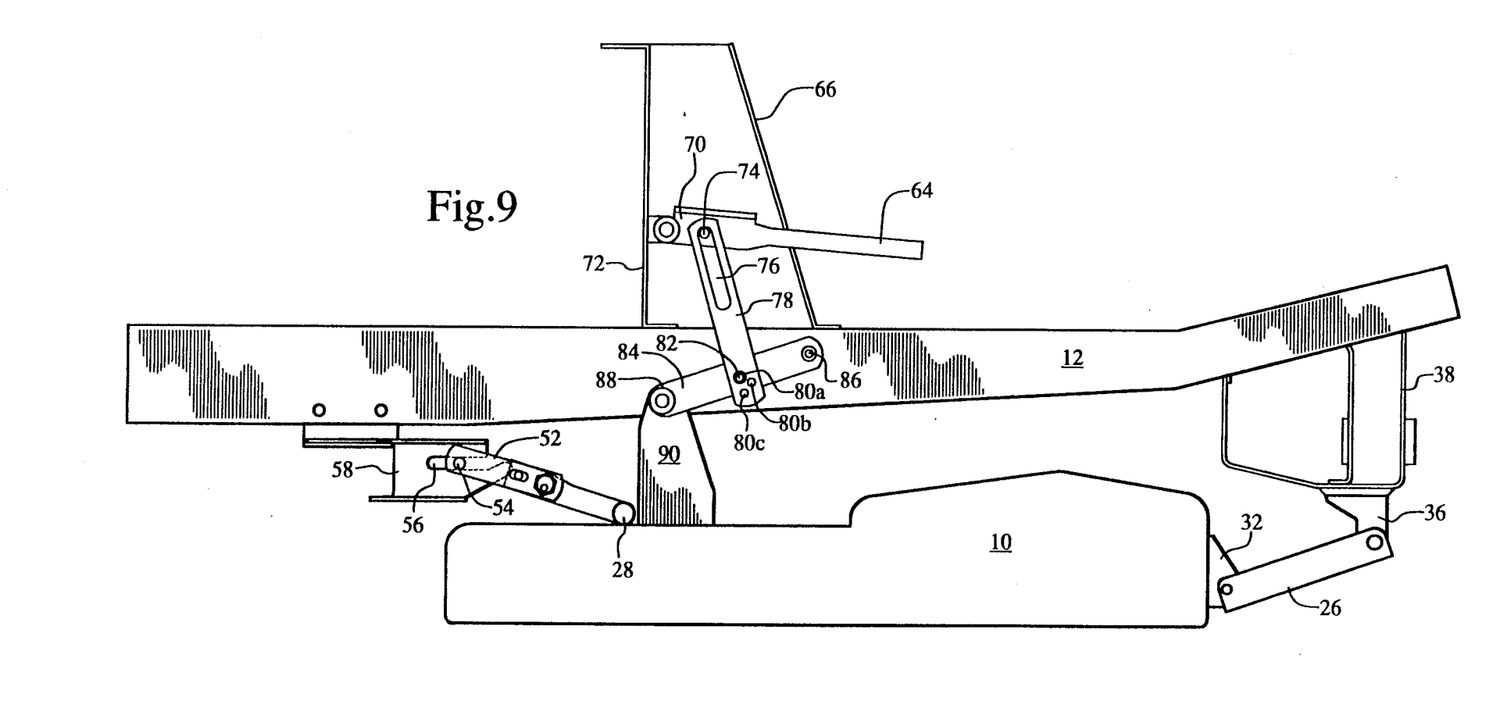
FIG. 9 is an enlarged, right side schematic illustrating the mounting system and height adjustment mechanism of the present invention with the cutting deck in a lower position.

The cutting height for deck 10 is selectively adjustable by the user of mower 24 by moving lever 64 as desired. FIGS. 8 and 9 best illustrate the interrelationship of the components when set in a raised position, (FIG. 8), and in a lowered position (FIG. 9). As clearly shown in the drawings, front support link 26 and rear support link 28 cooperate to maintain cutting deck 10 in a generally level orientation regardless of the cutting height selected by the user.

The distal end of lever 64 protrudes through panel 66 of the body of mower 24 and has handgrip 68 secured thereon, with the opposite end 70 of lever 64 being pivotally secured to member 72 which is rigidly secured to the upper surface of frame 12. Located intermediate of end 70 and handgrip 68 on lever 64 is shoulder bolt 74, disposed within slot 76 so that upper link 78 is slidably secured to lever 64.

The lower end of upper link 78 includes at least one hole formed therethrough, and preferably three such holes 80A, 80B and 80C as shown in FIGS. 8 and 9. In the preferred embodiment shown, shoulder bolt 82 is disposed through hole 80A to pivotally secure upper link 78 to lower link 84. Holes 80B and 80C may be similarly utilized as desired in order to vary the range of available cutting heights for deck 10. Leading end 86 of lower link 84 is pivotally secured to frame 12, while trailing end 88 is pivotally secured to bracket 90. Bracket 90 is fixedly secured by bolting, welding, or other suitable means to the upper surface of cutting deck 10.

Body panel 66 preferably includes a vertically oriented, generally rectangular opening formed therethrough, through which lever 64 protrudes, said opening having a series of notches formed therein for retaining lever 64 in a plurality of difference selected positions. Those skilled in the art will fully understand this aspect of the invention, even though it is not explicitly illustrated in the drawings herein, as such slotted rectangular openings have been similarly employed in a variety of conventional devices. As shown in FIG. 7, spring 92 may be utilized to pull lever 64 laterally to engage one of such stops in order to prevent inadvertent horizontal movement of lever 64 and the resulting change in cutting height for deck 10.

The preferred embodiment of the components comprising the mounting system and height adjustment mechanism for cutting deck 10 are illustrated in exploded form in FIG. 7. In order to ensure a complete and thorough disclosure of the best mode for carrying out the principles of this invention, many generally conventional components such as nuts, bolts, spacers, and other miscellaneous hardware items are illustrated in FIG. 7, but not discussed in this specification. Those skilled in the art of mower assembly will readily understand the construction of the preferred embodiment of this invention upon viewing the drawings in conjunction with this specification.

The advantages provided by the present invention are intended primarily for use with rear engine riding mowers having cutting decks of approximately thirty inches (30") in diameter. It has been found preferable to utilize the unique cutting deck mounting system for such mowers so that the frame need not be inordinately strengthened to avoid torsional flexing, thereby keep down both the weight and cost of the mower. It will be clear to those skilled in art, however, that the teachings of this disclosure may be equally applicable to riding mowers of any style and size.

While the principles of the cutting deck mounting system of the present invention have been made clear, it will be immediately apparent to those skilled in the art that they are many possible modifications to the disclosed arrangement without departing from the basic spirit of the present invention. Accordingly, the following claims are intended to cover and embrace not only the specific embodiment disclosed herein, but also such modifications within the spirit and scope of this invention.

What I claim is:

1. A cutting deck mounting system for use on a riding lawn mower having a pair of laterally opposed front wheels, a pair of laterally opposed rear wheels, a frame, a body, and a rear axle housing having laterally opposed axles extending therefrom and engaging said rear wheels, said mounting system comprising:
   front linkage means, attached to a front portion of the cutting deck and to a portion of the frame, for supporting the front edge of the cutting deck;
   a plurality of mounting brackets disposed on said rear axle housing, having longitudinal slots formed therein;
   rear linkage means, having a first portion secured to an upper surface of the cutting deck and a second portion slidably engaging said longitudinal slots in said mounting brackets; and
   height adjustment means for selectively raising and lowering the cutting deck, and for maintaining the cutting deck at a selected one of a plurality of cutting heights, operable by the driver of the riding mower while in normal operating position,
   said front and rear linkage means being operative to maintain the cutting deck in a substantially constant horizontal orientation relative to the ground in each of said plurality of cutting heights,
   said rear linkage means being further operative to maintain the latitudinal axis of the cutting deck generally parallel to the axles during normal operation of the riding mower.

2. A mounting system as set forth in claim 1, further comprising level adjustment means for selectively adjusting the horizontal orientation of the cutting deck relative to the ground.

3. A mounting system as set forth in claim 1, wherein said front linkage means comprise:
   a front bracket fixedly secured to a forward facing surface of the cutting deck; and
   a link having first and second ends, said first end being pivotally attached to a portion of the frame disposed generally between the front wheels, and said second end being pivotally attached to said front bracket.

4. A mounting system as set forth in claim 1, wherein:
   the number of said mounting brackets is two, with one each being disposed on opposite lateral ends of the rear axle housing; and
   said rear linkage means comprise a rod, having a generally straight central portion rotatably secured to an upward facing surface of the cutting deck, and contiguous end portions formed at right angles to said central portion and extending generally upwardly and rearwardly from said upward facing surface of the cutting deck,
   said end portions of said rod having engagement means attached thereto for slidably engaging said longitudinal slots in said mounting brackets.

5. A mounting system as set forth in claim 4, wherein said engagement means comprise:
   a pair of generally rectangular plates, each having a pair of longitudinally spaced apart holes formed in one end thereof, and a laterally extending member fixed to the other end thereof, said laterally extending member being configured to slidably fit in said longitudinal slot,
   each of said plates being secured to an end portion of said rod by a pair of bolts fastened through said holes, said end portions having similarly oriented holes formed therethrough for alignment with said holes in said plates, with a nut threaded onto the distal end of each of said bolts.

6. A mounting system as set forth in claim 5, wherein:
   one of said holes in said plate is oversized, and the corresponding bolt has an eccentric nut threadingly engaged thereto, said eccentric nut having a cylindrical portion and a hexagonal portion, said cylindrical portion being received by said oversized hole,
   said eccentric nut being operative to allow adjustment of the longitudinal alignment between said plate and said end portion of said rod, thereby providing means for selectively adjusting the orientation of the cutting deck relative to the ground.

7. A mounting system as set forth in claim 1, wherein said height adjustment means comprise:
   a lifting bracket, fixedly secured to a upward facing surface of the cutting deck;
   a lower link having first and second ends, said first end being pivotally attached to said lifting bracket, and said second end being pivotally attached to said frame;
   an upper link having first and second ends, said first end being pivotally attached to said lower link at a portion of said lower link intermediate said first and second ends thereof; and
   a handle, having a distal end extending outwardly through an opening in the body of the riding mower, an attachment end pivotally attached to a rigid member fixedly secured to the frame, and a central portion intermediate said distal end and said attachment end,
   said central portion of said handle being pivotally attached to said second end of said upper link, and
   said opening having a plurality of notches formed therein, each of said notches being suitable for supporting said handle and corresponding to a different cutting height for the cutting deck, whereby the user of the riding lawn mower can selectively adjust the cutting height by grasping said distal end of said handle and moving said handle to one of said notches corresponding to the desired cutting height.

8. A cutting deck mounting system as set forth in claim 7, wherein;

said first end of said upper link includes a plurality of holes formed therethrough, each of said holes being suitable for purposes of pivotally securing said upper link to said lower link, wherein each of said holes corresponds to a different cutting height for said cutting deck, so that the cutting height can be varied by using a different one of said holes for attaching said upper link to said lower link.

9. A cutting deck mounting system as set forth in claim 7, wherein;

said second end of said upper link has an elongated slot formed therein, said handle being pivotally and slidably attached to said upper link at said elongate slot, thereby enabling upward movement of the cutting deck in the event the cutting deck is forcibly displaced during normal operation of the riding mower, said upward movement being provided by the sliding of said upper link along the point of attachment with said handle.

10. A cutting deck mounting system for use on riding lawn mowers having an engine, a frame, a pair of laterally spaced apart front wheels supporting the front portion of the frame, a pair of laterally spaced apart rear wheels supporting the rear portion of the frame, an axle housing disposed between the rear wheels having laterally opposed axles extending therefrom, and a cutting deck suspended beneath the frame, said mounting system comprising:

a front link having first and second ends, said first end being pivotally attached to a front portion of the cutting deck and said second end being pivotally attached to a front portion of the frame;

a rear link having first and second ends, said first end being pivotally attached to a central portion of the cutting deck and said second end being pivotally attached to the axle housing; wherein said front and rear links cooperate to maintain the latitudinal axis of the cutting deck in an orientation generally parallel to the drive shafts extending from the axle housing.

11. A cutting deck mounting system as set forth in claim 10, wherein:

the cutting deck includes a first mounting bracket fixedly secured to a front portion thereof, said first mounting bracket having a pair of laterally opposed, spaced apart, forwardly extending ears, each of said ears having a hole formed therein;

said front portion of the frame has a second mounting bracket attached thereto, said second mounting bracket having a pair of laterally opposed, downwardly extending ears, each of said ears having holes formed therein; and said front link comprises a generally Y-shaped member having a single front attachment point and two rear attachment points, said front attachment point being pivotally attached to said holes in said downwardly extending ears of said second mounting bracket, and said two rear attachment points being pivotally attached to said holes in said forwardly extending ears of said first mounting bracket.

12. A cutting deck mounting system as set forth in claim 10, further comprising a height adjustment mechanism for selectively varying the height of the cutting deck relative to the ground.

13. A cutting deck mounting system as set forth in claim 12, wherein said height adjustment mechanism comprises;

a lifting bracket, fixedly secured to an upward facing surface of the cutting deck;

a lower link having first and second ends, said first end being pivotally attached to said lifting bracket, and said second end being pivotally attached to said frame;

an upper link having first and second ends, said first end being pivotally attached to said lower link at a portion of said lower link intermediate said first and second ends thereof; and a handle having a distal end extending outwardly through an opening in the body of the riding mower, an attachment end pivotally attached to a rigid member fixedly secured to the frame, and a central portion intermediate said distal end and said attachment end, said central portion of said handle being pivotally attached to said second end of said upper link, and said opening in the body having a plurality of notches formed therein, each of said notches being suitable for supporting said handle and corresponding to a different cutting height for the cutting deck, whereby the user of the riding lawn mower can selectively adjust the cutting height by grasping said distal end of said handle and moving said handle to one of said notches corresponding to the desired cutting height.

* * * * *